US009491607B2

(12) United States Patent
Vandwalle et al.

(10) Patent No.: US 9,491,607 B2
(45) Date of Patent: Nov. 8, 2016

(54) WIRELESS SCAN AND ADVERTISEMENT IN ELECTRONIC DEVICES

(75) Inventors: Pierre B. Vandwalle, Sunnyvale, CA (US); Charles F. Dominguez, Redwood City, CA (US); Tito Thomas, San Jose, CA (US); Christiaan A. Hartman, San Jose, CA (US)

(73) Assignee: Apple Inc., Cupertino, CA (US)

(*) Notice: Subject to any disclaimer, the term of this patent is extended or adjusted under 35 U.S.C. 154(b) by 121 days.

(21) Appl. No.: 13/398,545

(22) Filed: Feb. 16, 2012

(65) Prior Publication Data

US 2013/0215757 A1    Aug. 22, 2013

(51) Int. Cl.
H04W 8/00      (2009.01)
H04W 40/24     (2009.01)
H04W 48/16     (2009.01)

(52) U.S. Cl.
CPC ........... *H04W 8/005* (2013.01); *H04W 40/244* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2002/0181417 A1* | 12/2002 | Malhotra et al. | 370/329 |
| 2004/0090929 A1* | 5/2004 | Laux et al. | 370/311 |
| 2005/0063334 A1* | 3/2005 | Fnu et al. | 370/329 |
| 2006/0089964 A1 | 4/2006 | Pandey | |
| 2006/0135068 A1 | 6/2006 | Jaakkola | |
| 2007/0097940 A1* | 5/2007 | Yuen | 370/338 |
| 2008/0040509 A1 | 2/2008 | Werb | |
| 2008/0051099 A1 | 2/2008 | Moore | |
| 2008/0205340 A1 | 8/2008 | Meylan | |
| 2008/0253327 A1* | 10/2008 | Kohvakka et al. | 370/330 |
| 2009/0221287 A1 | 9/2009 | Balasubramanian | |
| 2010/0195595 A1* | 8/2010 | Iwata | 370/329 |
| 2010/0265885 A1* | 10/2010 | Umeuchi | H04W 48/16 370/328 |
| 2010/0265928 A1 | 10/2010 | Peng | |

(Continued)

FOREIGN PATENT DOCUMENTS

GB         2449313      11/2008
JP     2010520667 A     6/2010

(Continued)

OTHER PUBLICATIONS

Merriam-webster.com, "interval," in Merriam-Webster.com Unabridged. Source location: Encyclopedia Britannica Co. http://www.merriam-webster.com/dictionary/interval. Available: http://www.merriam-webster.com. Accessed: May 13, 2015.*
Search Report and Written Opinion received in corresponding PCT Application No. PCT/US2013/024000, dated May 3, 2013.

*Primary Examiner* — Joshua Kading
(74) *Attorney, Agent, or Firm* — Blank Rome LLP

(57) ABSTRACT

An electronic device performs a scan of each wireless channel in a sequence of wireless channels to detect advertising frames transmitted from other electronic devices. When performing the scan, the electronic device waits for a next transmit time. After the next transmit time, the electronic device configures the electronic device to monitor a next wireless channel from the sequence of wireless channels. The electronic device then monitors the next wireless channel for the advertising frames for a scanning time interval, wherein a duration of the scanning time interval is set in accordance with one or more transmit times used for transmitting advertising frames on the wireless channels in the sequence of wireless channels. When wireless channels from the sequence of wireless channels remain to be scanned, the electronic device returns to wait for a next transmit time.

24 Claims, 7 Drawing Sheets

(56) References Cited

U.S. PATENT DOCUMENTS

| | | | |
|---|---|---|---|
| 2010/0290421 A1* | 11/2010 | Morioka | 370/329 |
| 2010/0309893 A1* | 12/2010 | Zhu et al. | 370/338 |
| 2011/0211555 A1* | 9/2011 | Cohn | H04W 36/0072 370/331 |
| 2013/0003715 A1* | 1/2013 | Xhafa et al. | 370/349 |
| 2013/0040574 A1* | 2/2013 | Hillyard | 455/41.2 |

FOREIGN PATENT DOCUMENTS

| | | |
|---|---|---|
| WO | 2007074841 A | 7/2007 |
| WO | 2008048809 | 4/2008 |
| WO | 2011141844 A | 11/2011 |

\* cited by examiner

| CHANNEL (TRANSMIT INTERVAL) | SCAN CH 1 | SCAN CH 2 | SCAN CH 3 | SCAN CH 4 | SCAN CH 5 | SCAN CH 6 |
|---|---|---|---|---|---|---|
| CH 1 (100 MS) | - | 500 | 500 | 500 | 500 | 500 |
| CH 2 (110 MS) | 550 | - | 550 | 550 | 550 | 550 |
| CH 3 (120 MS) | X | 600 | - | 600 | 600 | ~~600~~ |
| CH 4 (130 MS) | X | X | 650 | - | 650 | 650 |
| CH 5 (140 MS) | X | X | X | 700 | - | 700 |
| CH 6 (150 MS) | X | X | X | X | 750 | - |

FIG. 8

WIRELESS SCAN AND ADVERTISEMENT IN ELECTRONIC DEVICES

BACKGROUND

1. Field

The described embodiments relate to electronic devices. More specifically, the described embodiments relate to wireless communication between electronic devices.

2. Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) standards 802.11), and/or another type of wireless interface. In some of these electronic devices, the network interfaces can be used to detect other electronic devices as part of a process for enabling communication between the electronic devices. For example, one electronic device can broadcast an advertising frame, and another electronic device can monitor for the advertising frame to detect the electronic device.

Many of these electronic devices, particularly battery-powered electronic devices, have low power-consumption targets, and so the power that can be allocated for detecting other devices can be minimal. For example, for some devices, a power consumption target for detecting other devices can be in the range of 10 mW/hour. Because the electronic devices require minimal power consumption while detecting other devices, the use of the radios (which typically consumes the largest portion of the allocated power) to detect other devices can be very limited. For example, given the 10 mW/hour target, as little as a few percent of possible radio time (e.g., around 3% of radio time) can be available for detecting other electronic devices.

In order to discover other electronic devices that are infrequently monitoring for advertising frames (e.g., when another electronic device is switching in and out of a reduced-power "sleep" state and hence may be monitoring for advertising frames infrequently), a passive scan procedure can be used. Differently than an active transmit procedure that consists of transmitting advertising frames with broadcast probe request frames at arbitrary times from an electronic device, and thus requesting an answer from the other electronic devices and requiring the other electronic device to be monitoring for advertising frames, the passive scan procedure consists in listening on a given wireless channel with a listening time, i.e., a "dwell time," that is long enough to catch a advertising frame from the other electronic device. Existing implementations of passive scanning use a 110-120 ms dwell time in order to detect periodic advertising frames spaced at a constant 100-104 ms.

However, there are two problems with existing implementations that use the constant periods for passive scans that become particularly apparent when multiple devices are attempting to discover one another. A larger number of devices means that many devices in range of each other may be advertising, leading to relatively long discovery times due to contention for channels and the need for individual discovery of multiple other devices. This can lead to a power-consumption problem because, even using the radios as sparingly as possible, the power consumption required for broadcasting advertising frames to be detected using passive scans and performing passive scans is high in comparison with power targets for many battery-powered electronic devices.

SUMMARY

The described embodiments include an electronic device that wirelessly communicates with other electronic devices. In the described embodiments, the electronic device first determines that a sequence of wireless channels is to be scanned to detect advertising frames transmitted from other electronic devices. The electronic device then performs a scan of each wireless channel in the sequence of wireless channels to detect advertising frames transmitted from other electronic devices. When performing the scan, the electronic device waits for a next transmit time. After the next transmit time, the electronic device configures the electronic device (e.g., a processing subsystem, a networking subsystem, and/or another subsystem in the electronic device) to monitor a next wireless channel from the sequence of wireless channels. The electronic device then monitors the next wireless channel for the advertising frames for a scanning time interval, wherein a duration of the scanning time interval is set in accordance with one or more transmit times used for transmitting advertising frames on the wireless channels in the sequence of wireless channels. When wireless channels from the sequence of wireless channels remain to be scanned, the electronic device returns to wait for a next transmit time.

In some embodiments, the electronic device is configured to determine that advertising frames are to be transmitted from the electronic device on a home wireless channel to enable other electronic devices to detect the electronic device. The electronic device then transmits advertising frames by, before each next transmit time, configuring the electronic device to transmit on the home wireless channel, and, at each next transmit time, transmitting an advertising frame from the electronic device on the home wireless channel.

In some embodiments, the wireless channels comprise wireless channels from a predetermined group of social wireless channels, and the home wireless channel is a channel from the group of social wireless channels.

In some embodiments, each transmit time is separated by a transmit interval from a preceding transmit time and a subsequent transmit time, wherein a duration of the transmit interval is set according to the home wireless channel used in the electronic device.

In some embodiments, when configuring the electronic device to monitor the next wireless channel from the sequence of wireless channels after the next transmit time, the electronic device is configured so that, when advertising frames are not being transmitted from the electronic device, the electronic device waits a predetermined time after the next transmit time before configuring the electronic device to monitor the next wireless channel, and, when advertising frames are being transmitted from the electronic device, the electronic device waits until the advertising frame has been transmitted from the electronic device at the next transmit time before configuring the electronic device to monitor the next wireless channel.

In some embodiments, the scanning time interval is proportional to the transmit interval minus an overhead value, wherein the overhead value comprises a sum of: (1) a time for configuring the electronic device to transmit on the home wireless channel for the electronic device; (2) a time for transmitting an advertising frame on the home wireless channel from the electronic device; and (3) a time for configuring the electronic device to monitor a next wireless channel from the sequence of wireless channels.

In some embodiments, the scanning time interval is at least a predetermined multiple of the overhead value.

In some embodiments, each advertising frame comprises information for communicating with another electronic device that transmitted the advertising frame.

In some embodiments, the electronic device generates the sequence of wireless channels, wherein the sequence of wireless channels comprises a plurality of subsequences, each subsequence comprising a group of social wireless channels arranged in a predetermined order.

BRIEF DESCRIPTION OF THE FIGURES

FIG. 8 presents a table that shows scan periods for a set of wireless channels in accordance with the described embodiments.

In the figures, like reference numerals refer to the same figure elements.

DETAILED DESCRIPTION

Figure 1:
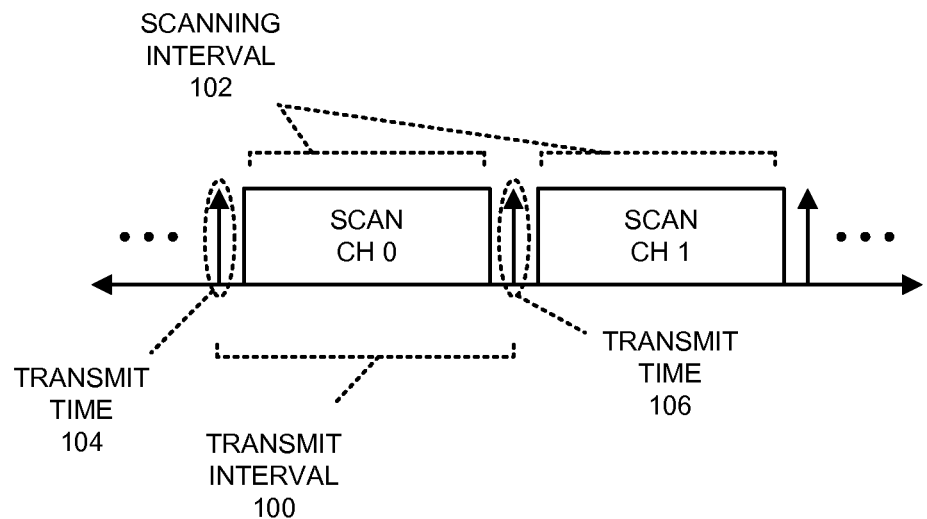
FIG. 1 presents a timeline diagram illustrating the scanning of wireless channels in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises the computer-readable storage medium and can execute code and/or use the data to perform the methods and processes.

In the following description, we refer to "some embodiments." Note that "some embodiments" describes a subset of all of the possible embodiments, but does not always specify the same subset of the embodiments.

Overview

In the described embodiments, an electronic device (e.g., electronic device 200 in FIG. 2) can perform operations to help discover other nearby electronic devices that are available for wirelessly communicating with the electronic device. In these embodiments, the electronic device can both passively scan a set of wireless channels for advertising frames transmitted from other electronic devices, and actively transmit advertising frames on a "home" wireless channel (which is, in some embodiments, one of the social wireless channels) to enable other electronic devices to discover the electronic device. The advertising frames generally contain information that enables electronic devices to determine information about the transmitting electronic device that can be used to enable subsequent communication with the transmitting electronic device. For example, the advertising frames can include information about an availability period during which the transmitting device will be monitoring a given channel for a given period of time to enable the transmitting device to receive frames transmitted from other electronic devices. In the described embodiments, the advertising frames can be management frames or data frames, in accordance with the underlying wireless standard.

In the described embodiments, when scanning the wireless channels for advertising frames and/or transmitting the advertising frames, an electronic device can scan and/or transmit using a predetermined set of "social" wireless channels (interchangeably "social channels"). The social wireless channels comprise any group of wireless channels agreed upon in advance that electronic devices can generally expect to be monitored by other electronic devices, thereby enabling simplified communication between electronic devices. For example, in some embodiments, the social channels include channels such as 1, 6, 11 in the 2.4 GHz band or channels 40, 104, and 153 in the 5 GHz band of the IEEE 802.11 specification. In alternative embodiments, any number of the available channels in the 2.4 GHz and 5 GHz bands can be included in the social channels. Note additionally that the described embodiments are not intended to be limited to the current IEEE 802.11 wireless channels or to the network scheme described in IEEE 802.11. For example, some embodiments can use social channels in the newly-proposed 60 GHz band of the 802.11 specification (i.e., using the 802.11ad standard). Generally, any electronic devices that use an advertising frame scanning and/or transmission scheme similar to the described embodiments can comprise transmission times and scanning intervals as herein described.

In the described embodiments, the electronic device comprises a mechanism (e.g., a count-down/count-up timer, or another mechanism) for keeping track of reoccurring/periodic "transmit times," each of which is separated by a transmit time interval from a preceding transmit time and a subsequent transmit time. At the transmit time, the electronic device may, but is not required to, transmit an advertising frame on the home wireless channel, which can be one of the social channels. In the described embodiments, the duration of the transmit time interval (and hence the time between transmit times) is set according to the social channel that is being used by the electronic device as the home wireless channel. More specifically, each social channel can have a different transmit time interval associated with it. For example, given that an electronic device is using an exemplary social channel 1 as the home wireless channel, a transmit time interval could be 110 ms, whereas for an exemplary social channel 2, the transmit time interval could be 120 ms, etc. Thus, using exemplary channel 1 as the home wireless channel, a transmit time could occur every 110 ms for the electronic device, and hence the electronic device might, but does not have to, transmit an advertising frame on home channel 1 every 110 ms.

As previously described, in the described embodiments, an electronic device can use wireless channel scanning to enable discovery of other nearby electronic devices. In these embodiments, an electronic device uses the above-described transmit times and transmit intervals to determine when and for how long to perform scans of the social channels to detect advertising frames transmitted from other electronic devices on the social channels. More specifically, between transmit times (and assuming that the radio in the electronic device is not being used for another purpose), the electronic device can reconfigure the radio to monitor one of the social channels. Then, as a subsequent transmit time approaches, the electronic device can again reconfigure the radio to enable the optional transmission of the advertising frame on the home channel for the electronic device. In this way, the electronic device can alternate between using the radio to transmit the advertising frames on the home channel, and scanning social channels for advertising frames from other electronic devices.

FIG. 1 presents a timeline diagram illustrating the scanning of wireless channels in accordance with the described embodiments. As can be seen in FIG. 1, a transmit interval 100 (e.g., 100 ms, 150 ms, 500 ms, or another time) separates a first transmit time 104 and a second transmit time 106. Between transmit times 104 and 106, a scan of exemplary social channel 0 is performed by the electronic device for a scanning interval 102. After transmit time 106, a scan of exemplary social channel 1 is performed by the electronic device (again for the scanning interval 102). This pattern can repeat indefinitely, with corresponding transmit times indicating the start of a next transmit interval 100, during which a social channel can be scanned for a scanning interval 102.

As can be seen in FIG. 1, scanning interval 102 is shorter than the transmit interval 100. Generally, scanning interval 102 is proportional to transmit interval 100 minus an overhead value. The overhead value includes an amount of time used for configuring the radio for monitoring a social channel for advertising frames, along with restoring the radio at the next transmit time. For example, the overhead value can include a sum of the amount of time that is used to (a) configure the radio to transmit an advertising frame on the home channel; (b) transmit the advertising frame on the home channel; and (c) configure the radio to monitor (scan) the given social channel. Although we describe this overhead value, in alternative embodiments, the overhead value includes additional or fewer times, including time for performing other operations for the radios, etc.

Because each of the social channels has a corresponding transmit interval and the scanning interval is configured using the duration of the transmit interval, the described embodiments can be configured so that two electronic devices on different home wireless channels from among the social channels can find each other in a limited number of scans of the social channels (note that the home wireless channels in this example are social channels). For example, in the described embodiments, a first electronic device that is using a first social channel as its home wireless channel can almost always find a second electronic device that is using a second social channel as its home wireless channel in two passes/scans of the set of social channels (during a "pass," each of the social channels is separately scanned for a scanning interval as shown in FIG. 1). More specifically, assuming that the first electronic device scans the second social channel, but does not encounter an advertising frame transmitted by the second electronic device during a first pass, in the described embodiments, because of the relative timing of the scanning intervals for the first electronic device (which are based on the first social channel) and the transmit times for the second electronic device (which are based on the second social channel), the first device almost always encounters an advertising frame transmitted by the second electronic device during a second pass. Note that this example assumes that the second device is transmits an advertising frame during at least the second pass. Specifically, the second device transmits an advertising frame at the transmit time for the second device that aligns with the second pass/scan by the first device. Generally, the second device should be transmitting advertising frames (and not optionally not transmitting advertising frames as described herein) in order to ensure that a first device discovers a second device within two passes/scans of the set of social channels.

Electronic Device

FIG. 1 presents a block diagram illustrating electronic device 200 in accordance with the described embodiments. Electronic device 200 includes processing subsystem 202, memory subsystem 204, and networking subsystem 206.

Processing subsystem 202 includes one or more devices configured to perform computational operations. For example, processing subsystem 202 can include one or more microprocessors, application-specific integrated circuits (ASICs), microcontrollers, and/or programmable-logic devices.

Memory subsystem 204 includes one or more devices for storing data and/or instructions for processing subsystem 202 and networking subsystem 206. For example, memory subsystem 204 can include dynamic random access memory (DRAM), static random access memory (SRAM), and/or other types of memory. In addition, memory subsystem 204 can include mechanisms for controlling access to the memory. In some embodiments, memory subsystem 204 includes a memory hierarchy that comprises one or more caches coupled to a memory in electronic device 200. In some of these embodiments, one or more of the caches is located in processing subsystem 202.

In some embodiments, memory subsystem 204 is coupled to one or more high-capacity mass-storage devices (not shown). For example, memory subsystem 204 can be coupled to a magnetic or optical drive, a solid-state drive, or another type of mass-storage device. In these embodiments, memory subsystem 204 can be used by electronic device 200 as fast-access storage for often-used data, while the mass-storage device is used to store less frequently used data.

Networking subsystem 206 includes one or more devices configured to couple to and communicate on a wired and/or wireless network (i.e., to perform network operations). For example, networking subsystem 206 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 206 includes processors, controllers, radios/antennas, sockets/plugs, and/or other devices used for coupling to, communicating on, and handling data and events for each supported networking system. In the following description, we refer to the mechanisms used for coupling to, communicating on, and handling data and events on the network for each network system collectively as the "interface" or "network interface" for the network system. Note that in some embodiments, a "network" between the devices does not yet exist, and hence electronic device 200 uses the mechanisms in networking subsystem 206 for performing simple wireless communication between the devices, e.g., transmitting advertising frames and/or scanning the social channels for advertising frames transmitted by other electronic devices as herein described.

Within electronic device 200, processing subsystem 202, memory subsystem 204, and networking subsystem 206 are coupled together using bus 210. Bus 210 is an electrical, optical, or electro-optical connection that the subsystems can use to communicate commands and data among one another. Although only one bus 210 is shown for clarity, different embodiments can include a different number or configuration of electrical, optical, or electro-optical connections between the subsystems.

Electronic device 200 can be (or can be included in) any device with at least one network interface. For example, electronic device 200 can be (or can be included in) a desktop computer, a laptop computer, a server, a media player, an appliance, a subnotebook/netbook, a tablet computer, a smart phone, a piece of testing equipment, a network appliance, a set-top box, a personal digital assistant (PDA), a toy, a controller, or another device.

Although we use specific components to describe electronic device 200, in alternative embodiments, different components and/or subsystems may be present in electronic device 200. For example, electronic device 200 may include one or more additional processing subsystems 202, memory subsystems 204, and/or networking subsystems 206. Additionally, one or more of the subsystems may not be present in electronic device 200. Moreover, in some embodiments, electronic device 200 may include one or more additional subsystems that are not shown in FIG. 1. For example, electronic device 200 can include, but is not limited to, a display subsystem for displaying information on a display, a data collection subsystem, an audio and/or video subsystem, an alarm subsystem, a media processing subsystem, and/or an input/output (I/O) subsystem. Also, although separate subsystems are shown in FIG. 1, in some embodiments, some or all of a given subsystem can be integrated into one or more of the other subsystems in electronic device 200.

Figure 3:
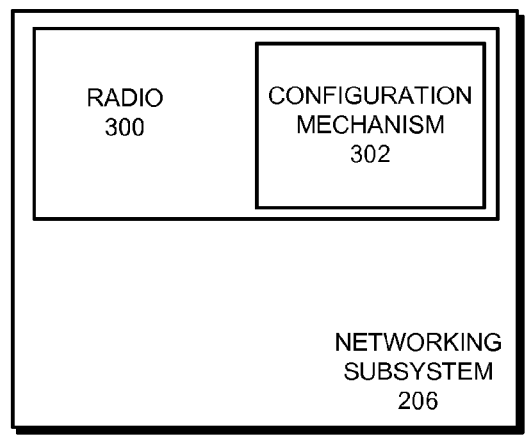
FIG. 3 presents a block diagram illustrating an expanded view of a networking subsystem in accordance with the described embodiments.

FIG. 3 presents a block diagram illustrating an expanded view of networking subsystem 206 in accordance with the described embodiments. As can be seen in FIG. 3, networking subsystem 206 comprises radio 300 and configuration mechanism 302. Radio 300 includes hardware and/or software mechanisms that are used for transmitting wireless signals from electronic device 200 and receiving signals at electronic device 200 from other electronic devices. Aside from the mechanisms herein described, radios such as radio 300 are generally known in the art and hence are not described in detail.

Although networking subsystem 206 can include any number of radios 300, embodiments with one radio 300 are herein described. Note, however, that the radios 300 in multiple-radio embodiments function in a similar way to the described single-radio embodiments.

Configuration mechanism 302 in radio 300 comprises one or more hardware and/or software mechanisms used to configure the radio to transmit and/or receive on a given channel (i.e., frequency). For example, in some embodiments, the configuration mechanism 302 can be used to switch radio 300 from monitoring and/or transmitting on a given channel in the 2.4 GHz and 5 GHz band of channels described in the IEEE 802.11 specification to monitoring and/or transmitting on a different channel. (Note that "monitoring" as used herein comprises receiving signals from other electronic devices and possibly performing one or more processing steps on the received signals, e.g., determining if the received signal comprises an advertising frame, etc.)

In the described embodiments, it takes time for configuration mechanism 302 to switch radio 300 from transmitting or receiving on a given channel to transmitting or receiving on a different channel. For example, in some embodiments, switching from transmitting or monitoring on a first channel to transmitting or monitoring on a second channel takes approximately 3 ms. Additionally, it takes time for radio 300 to transmit an advertising frame. For example, in some embodiments, transmitting an advertising frame takes approximately 3 ms. Hence, in some embodiments, an approximate total time for switching radio 300 to transmit on a first channel, transmitting a advertising frame on the first channel, and switching the radio to monitor on a different channel is approximately 9 ms. In the described embodiments, this "overhead" value is used to determine scanning interval 102 (as is described in more detail below).

Wirelessly Communicating Between Electronic Devices

Figure 4:
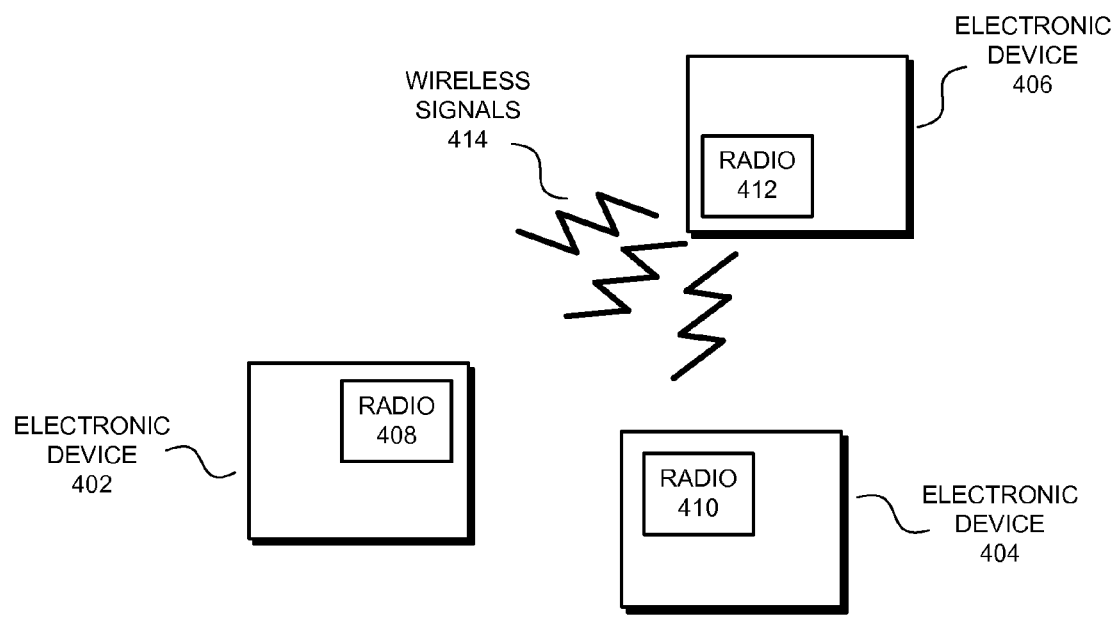
FIG. 4 presents a block diagram illustrating a group of electronic devices wirelessly communicating in accordance with the described embodiments.

FIG. 4 presents a block diagram illustrating electronic devices 402-406 wirelessly communicating in accordance with the described embodiments. More specifically, electronic devices 402-406 are wirelessly communicating while discovering one another by scanning wireless channels and/or transmitting advertising frames on wireless channels using the techniques herein described.

Figure 2:
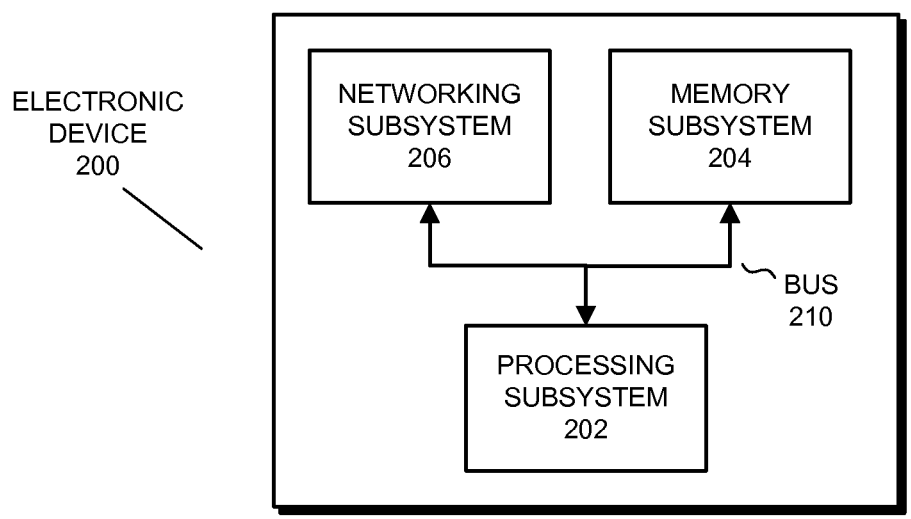
FIG. 2 presents a block diagram illustrating an electronic device in accordance with the described embodiments.

In some embodiments, electronic devices 402-406 comprise subsystems similar to subsystems 202-206 shown in FIG. 2, although alternative embodiments may include different types or arrangements of subsystems. In addition, radios 408-412 in electronic devices 402-406 can include mechanisms similar to those shown in radio 300 in FIG. 3. Generally, electronic devices 402-406 can include (or can be included within) any devices with a networking subsystem 206 that enables the electronic device to wirelessly communicate with another electronic device. This can comprise transmitting (e.g., multicasting) advertising frames on wireless channels to enable devices to make initial contact, followed by exchanging subsequent data/management frames (perhaps based on the information in the initially-multicast advertising frames) to establish and/or join an existing wireless network, establish a communication session (e.g., a TCP/IP session, etc.), configure security options (e.g., IPSEC), and/or exchange data/management frames for other reasons.

As can be seen in FIG. 4, wireless signals 414 (represented by jagged lines) are transmitted from a radio 412 in electronic device 406. In the described embodiments, radio 412 (as well as radios 408-410) comprises mechanisms similar to configuration mechanism 302 that can be used to configure the radio 412 to transmit signals using certain designated channels. For example, in the described embodiments, electronic device 406 can dynamically configure (or re-configure) radio 412 so that wireless signals 414 are transmitted on a "home" wireless channel for electronic device 406.

Wireless signals 414 comprise data/management frames that are encoded/included in wireless signals 414 using techniques known in the art. The frames comprise at least an advertising frame 500 (see FIG. 5) that contains information that enables other electronic devices to determine one or more properties of electronic device 406, e.g., an availability window during which electronic device 406 will be monitoring a home channel for data/management frames in signals transmitted from other electronic devices. (Note that, although we describe the embodiments using advertising frame 500, the data/management frames in wireless signals 414 can comprise any type of data/management frames.) In some embodiments, the frames are multicast frames, which comprise information that indicates that any receiving electronic device should process the frames.

Wireless signals 414 are received by radios 408 and 410 in electronic devices 402 and 404, respectively. For the sake of example, it is assumed that electronic device 402 is monitoring the wireless channel upon which wireless signals 414 are transmitted, but electronic device 404 is not. Thus, although wireless signals 414 are "received" by both devices (e.g., both devices are in range of wireless signals 414), only electronic device 402 processes the advertising frame 500 in wireless signals 414. In the described embodiments, both of electronic devices 402 and 404 can be performing a scan of the social wireless channels such as herein described, although electronic device 402 is the only one of the two devices that is monitoring the wireless channel upon which electronic device 406 transmits the advertising frame 500 at the time of the example. Note that, using the scanning technique herein described, electronic device 404, which misses a current advertising frame 500 from electronic device 406, will almost always receive the advertising frame 500 from electronic device 406 within two scans of the set of social channels (i.e., within two passes through the set of social channels, scanning each channel), as described below.

In the described embodiments, processing the advertising frame 500 in electronic device 402 comprises: receiving wireless signals 414 with the encoded/included advertising frame 500; decoding/extracting the advertising frame 500 from received wireless signals 414 to acquire the advertising frame 500; and processing the advertising frame 500 to determine information contained in the advertising frame 500. As indicated above, the advertising frame 500 comprises information that enables electronic device 402 to determine one or more properties of electronic device 406. Using the information, electronic device 402 can determine at least how/when to communicate with electronic device 406.

Although we describe the network environment shown in FIG. 4 as an example, in alternative embodiments, different numbers or types of devices may be present. For example, some embodiments comprise more or fewer electronic devices. As another example, in another embodiment, different devices are transmitting and/or receiving frames.

Advertising Frame

Figure 5:
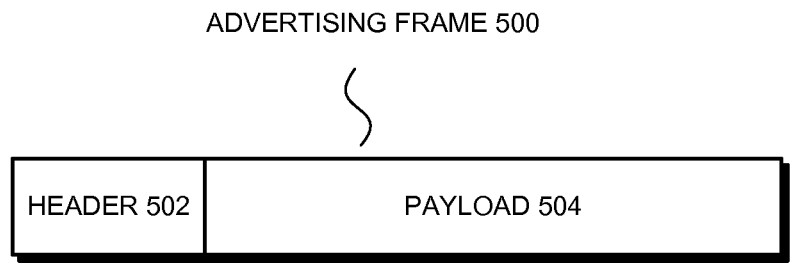
FIG. 5 presents a block diagram illustrating an advertising frame.

FIG. 5 presents a block diagram illustrating an advertising frame 500. As shown in FIG. 5, advertising frame 500 comprises header 502 and payload 504. Header 502 comprises information about an electronic device that transmitted the advertising frame 500, and payload 504 comprises information that can enable another device to determine one or more properties of the electronic device that transmitted the advertising frame 500. For example, in some embodiments, from the information in payload 504, a receiving electronic device can determine addressing information for the transmitting electronic device (although addressing information and other information may also be able to be determined from the header of advertising frame 500), one or more channels upon which the transmitting electronic device will be monitoring for and/or transmitting data/management frames (e.g., multicasting data/management frames) during an "availability period," and/or a schedule of when the transmitting electronic device will be monitoring for and/or transmitting data/management frames.

Note that advertising frame 500 is simply one example of an advertising frame, in some embodiments, advertising frame 500 comprises more, fewer, or different types of information. Generally, any information that can help in transmitting the advertising frame to a recipient, determining information about a transmitter (including an availability window for the transmitter), and/or determining other information that enables a receiving device to wirelessly communicate with another electronic device (e.g., a third electronic device) can be contained within advertising frame 500.

Channel Sequence

Figure 6:
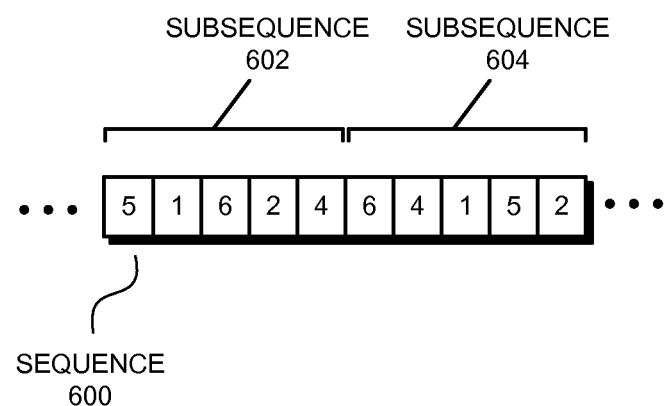
FIG. 6 presents a figure illustrating an exemplary sequence of wireless channels in accordance with the described embodiments.

In order to discover other electronic devices using the passive scanning technique, an electronic device can first determine a sequence of channels to be scanned (or can acquire a predetermined sequence, e.g., from a memory subsystem 204 in the electronic device). The sequence of channels can comprise repeated instances of the set of social channels arranged in a predetermined order (e.g., sequential, random, increasing/decreasing, alternating even/odd, etc.). For example, FIG. 6 presents a figure illustrating a possible sequence 600 of wireless channels in accordance with the described embodiments. As can be seen in FIG. 6, the social channels in the sequence 600 of channels comprise exemplary channels 1, 2, 4, 5, and 6. In subsequence 602 the social channels are arranged in a first random order, and in second subsequence 604 the social channels are arranged in a second random order. When scanning the social channels, an electronic device can proceed through the sequence of channels in order, one channel at a time, monitoring each of the channels for advertising frames transmitted by other devices during a scanning interval 102.

Although we present the arrangement in FIG. 6, any arrangement of wireless channels can be used, including shorter, longer (as indicated by the ellipses in FIG. 6), or different sequences 600. Generally, any arrangement or sequence of a set of wireless channels that is to be scanned for advertising frames or wireless signals from another device can be used.

Advertising Frame Scanning and Transmission Process

As previously indicated, the described embodiments can perform a scanning process during which an electronic device 200 configures a radio 300 in a networking subsystem 206 to monitor for advertising frames 500 transmitted from another electronic device 200. In these embodiments, the electronic device can determine that a transmit time 104 has occurred and optionally transmit an advertising frame 500 on a home wireless channel. After transmitting the advertising frame 500, or, when no advertising frame 500 is transmitted at the transmit time, when a predetermined time (e.g., 5 ms) has passed since the transmit time 104, the electronic device 200 can configure radio 300 to monitor a next social channel from a sequence 600 of social channels in an attempt to detect advertising frames 500 transmitted by other electronic devices 200. The channel can be monitored for a scanning interval 102, and then the electronic device 200 can reconfigure the radio 300 to transmit an advertising frame 500 on the home channel (or to prepare for a scan of a next social channel in the sequence 600). This process can continue until a predetermined condition is met. For example, the process can continue until the electronic device 200 has scanned each social channel in the sequence 600 of social channels a given number of times, until the electronic device 200 has encountered one or more other electronic devices, until a predetermined time has passed, and/or until another condition is met.

In the described embodiments, the transmit interval 100 that is used to determine when to (optionally) transmit advertising frames 500 and when to scan the social channels is set in accordance with the social channel that is being used as the home wireless channel in an electronic device 200. In these embodiments, if the transmit intervals 100 were equal (or one was a multiple of the other) for two or more of the social channels, it is possible that a first electronic device that was scanning the social channels would be unable to find a second electronic device on a different home channel because the second electronic device could be transmitting advertising frames 500 at the same times as the first electronic device, and hence channel scans performed by the first electronic device could fall between the transmissions of advertising frames 500 by the second device. For this reason, the described embodiments use a different transmit interval for each of the social channels. For example, some embodiments could use the following transmit intervals for exemplary social channels 1, 6, and 11 in the 2.4 GHz band and 40, 104, and 153 in the 5 GHz band as described in the IEEE 802.11 specification:

TABLE 1

Exemplary Per-Channel Transmit Interval

| CHANNEL | TRANSMIT INTERVAL |
|---|---|
| CH 1 | 100 ms |
| CH 6 | 110 ms |
| CH 11 | 120 ms |
| CH 40 | 130 ms |
| CH 104 | 140 ms |
| CH 153 | 150 ms |

In alternative embodiments, other channels may be used, each with a different transmit interval. For example, in some embodiments, each of the channels in the 802.11g and 802.11a bands as described in the IEEE specification could be used as the social channels. As another example, any predetermined set of wireless channels in a given wireless communication scheme could be used as the social channels.

In some embodiments, the transmit interval could be set so that the transmit interval for each nth social channel in a sequence 600 of social channels is as follows:

$$\text{transmit\_interval}(n) = \text{transmit\_interval}(0) + n*\text{delta},$$

with the transmit interval of a first channel in the sequence of social channels (i.e., transmit_interval (0)) equal to, e.g., 100 ms, and the delta being greater than an overhead value that comprises (as described with respect to FIG. 1) a sum of the amount of time that is used to (a) configure the radio to transmit an advertising frame 500 on the home channel; (b) transmit the advertising frame 500 on the home channel; and (c) configure the radio to monitor (scan) a given social channel. For example, if the overhead is 5 ms, the delta can be set to 8 ms, 10 ms, etc. In the described embodiments, transmit_interval (0), i.e., the shortest of the time intervals for the social channels, is configured to be larger than the overhead time by some multiple, e.g., 5, 10, or another multiple.

Figure 7:
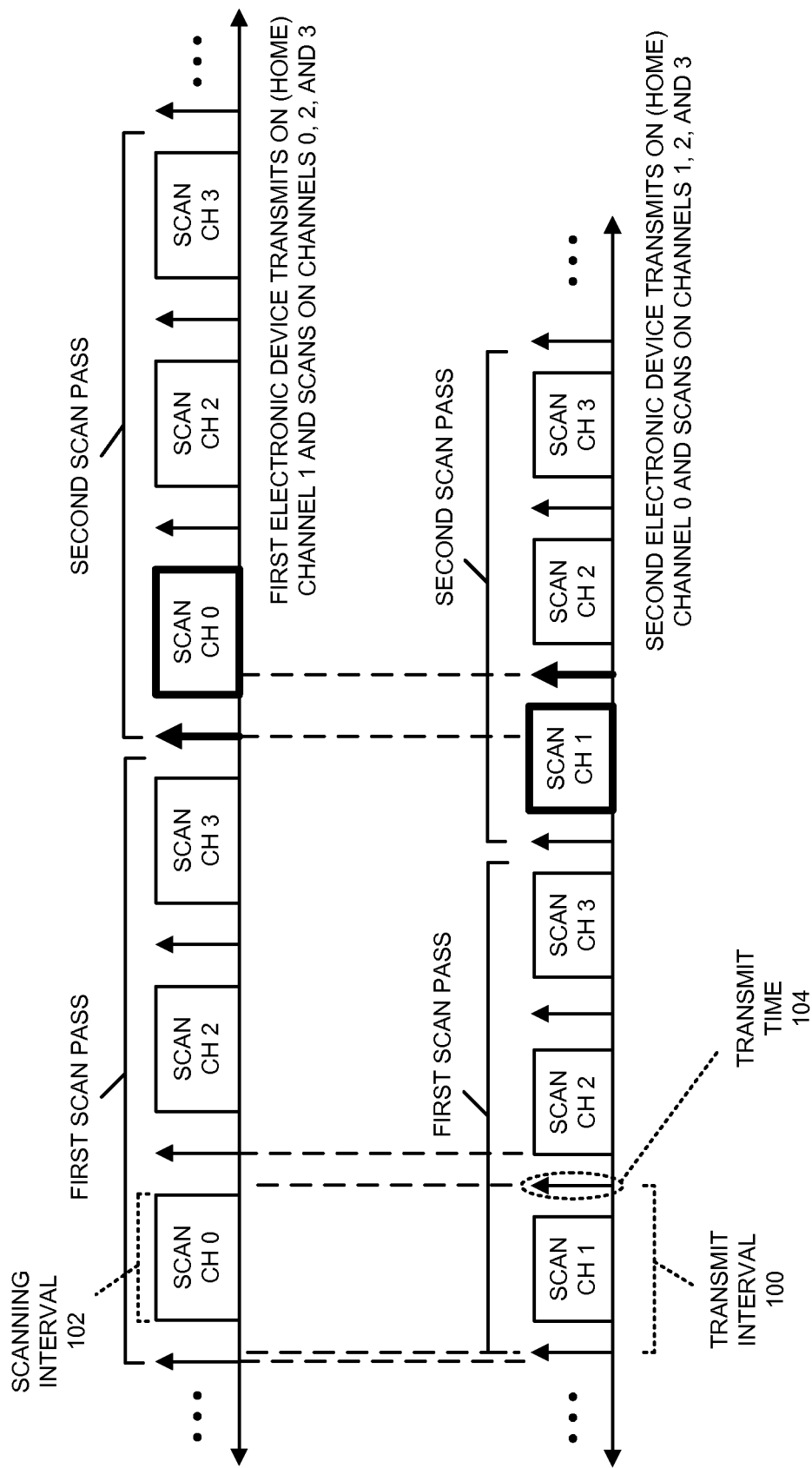
FIG. 7 presents a timeline diagram of a scan sequence for a first and second electronic devices in accordance with the described embodiments.

FIG. 7 presents a timeline diagram of a scan sequence for a first and second electronic devices in accordance with the described embodiments. More specifically, FIG. 7 shows a "meetup" or discovery of one device by another device while scanning the social channels. Note that FIG. 7 shows a two-way discovery process in which a first device and a second device are both transmitting advertising frames 500 at transmit intervals and performing scans of a set of social channels. In this arrangement, the first and second electronic devices both find the other device. In alternative embodiments, the discovery may only be one device finding another device, or may be multiple devices finding some number of the other devices.

During the exemplary scanning process shown in FIG. 7, each device makes two scanning cycles (or "passes") through a set of social channels; the first electronic device, which uses channel 1 as its home channel, scans wireless channels 0, 2, and 3 twice, and the second electronic device, which uses channel 0 as its home channel, scans wireless channels 1, 2, and 3 twice. Note that the devices need not continue to scan after finding one another, however, in some embodiments, the electronic devices can be configured to scan the social channels a given number of times to enable the discovery of other available electronic devices (e.g., third, fourth, etc. electronic devices), including electronic devices that have not started transmitting advertising frames 500 until one or more scan passes have been made by the first and second electronic devices.

As can be seen in FIG. 7, the electronic devices discover each other in the second pass. Illustrating this, the transmit time when the advertising frame 500 that is detected by the other device is transmitted is shown in bold for both electronic devices in FIG. 7, as is the scan interval in which the advertising frame 500 is detected. However, during the first pass, the first device transmits advertising frames 500 on its home channel 1 at times when the second device is not scanning channel one. Additionally, during the first pass, the second device transmits advertising frames 500 on its home channel 0 at times when the first device is not scanning channel 0. This is shown by the dashed lines drawn from the transmit times in each of the timelines in the first scan pass.

The devices discover each other in the second pass because the devices have "drifted" with respect to one another by at least one overhead value. In other words, because the closest transmit time intervals are separated by at least one overhead value for different social channels (see the exemplary per-channel transmit intervals in Table 1), when the second pass occurs, the transmit times (and hence channel scans) have drifted relative to one another by at least the amount of time for the overhead value. Note that, while this is true for neighboring channels (i.e., channels separated by one overhead value), the drift can be larger for social channels whose transmit times differ by more than one overhead value. This means that a given device should almost always be able to find a second device on a different home channel in a set of social channels within two passes through a sequence of social channels.

FIG. 8 presents a table that shows exemplary scan periods for an exemplary set of social channels (channels 1-6) in accordance with the described embodiments. As can be seen in FIG. 8, a scan pass through the social channels scans the 5 social channels aside from a home channel for a device. For example, a device that is using channel 3 as its home channel will scan channels 1, 2, 4, 5, and 6. Recall that the scans occur in a scanning interval that is defined using the transmit interval (as shown in FIGS. 1 and 7) and hence a "scan period" in which each of the social channels is scanned is 5 times the duration of a transmit interval for the home channel for an electronic device. An electronic device scans each of the social channels once in a corresponding scan period. For example, as shown in FIG. 8, the scan period for an electronic device that is using channel 1 as its home channel is 500 ms, and so the electronic device will scan each of social channels 2-6 with a 500 ms period.

As shown in FIG. 8, one of the scan periods is incompatible with another of the scan periods (shown by the hash marks in channel 3's scan of channel 6). This occurs because the transmit intervals are multiples of one another. Specifically, channel 3's scan period of 600 ms is a multiple of channel 6's transmit interval of 150 ms. Thus, in some cases, the transmit times for channels 3 and 6 could be aligned such that the electronic device using channel 3 as the home channel would not discover electronic devices using channel 6 as the home channel. Some embodiments avoid this case by using transmit intervals that are not multiples of one another. Alternative embodiments avoid this case by using different scanning intervals for a given channel and/or using different transmit intervals on a per channel or per-scan-pass basis.

Note also that some scan periods (and the underlying scan intervals) are long enough that a device using the scan interval should discover a device on a different channel in a single pass. This is shown with an "X" in a corresponding scan box in FIG. 8. For example, a device using channel 6 as its home channel scans with a scanning interval of e.g., 140 ms (within a transmit interval of 150 ms), so a device using channel 1 as its home channel should be discovered in a first pass because the transmit interval for channel 1 is 110 ms, which is short enough for two advertising frames 500 to be transmitted during channel 6's scan interval of 140 ms.

Figure 9:
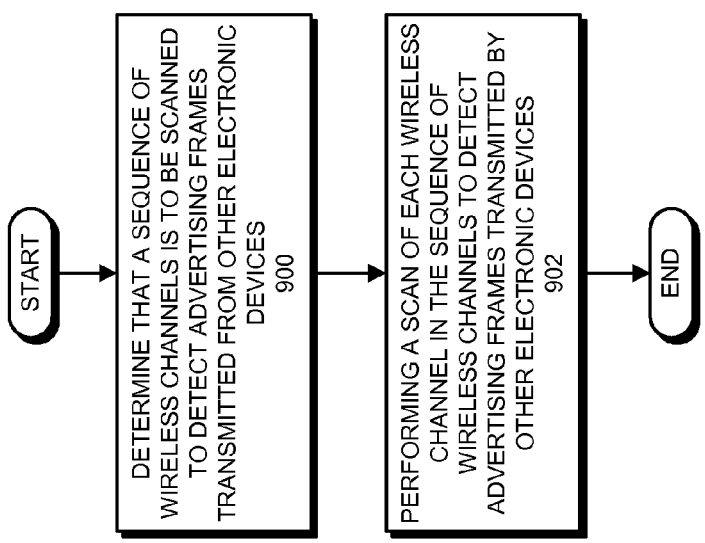
FIG. 9 presents a flowchart illustrating a process for scanning a set of wireless channels in accordance with the described embodiments.

FIG. 9 presents a flowchart illustrating a process for scanning a set of wireless channels for advertising frames 500 in accordance with the described embodiments. As shown in FIG. 9, the process starts when an electronic device 200 determines that a sequence 600 of wireless channels is to be scanned to detect advertising frames 500 transmitted from other electronic devices 200 (step 900). This can occur when networking subsystem 206 in electronic device 200 receives a signal (e.g., a scan request, etc.) from an operating system on the device (which can come from an application on the device that is attempting to form connections with other devices) or otherwise determines that a sequence 600 of wireless channels is to be scanned.

In some embodiments, networking subsystem 206 can be configured to periodically and automatically scan the wireless channels, which can occur separately from receiving a request from an application/the operating system to perform the scan. However, as described above, the power consumption targets for the electronic device 200 can be restrictive, so the automated scan of the wireless channels can occur infrequently. For example, the device can make a pass through the sequence 600 of channels every 10 s (versus multiple consecutive passes through the sequence 600 for a requested scan). In addition, the sequence 600 of channels for such automatic scans can be different and/or shorter than a sequence 600 for a requested scan. In these embodiments, determining that the sequence 600 of wireless channels is to be scanned such as in step 902 can mean determining that an automatic scan is to be performed.

After making the determination, electronic device 200 performs a scan of each wireless channel in the sequence 600 of wireless channels to detect advertising frames 500 transmitted by other electronic devices (step 902). The operations performed when scanning each of the wireless channels is described below with respect to FIG. 10.

Figure 10:
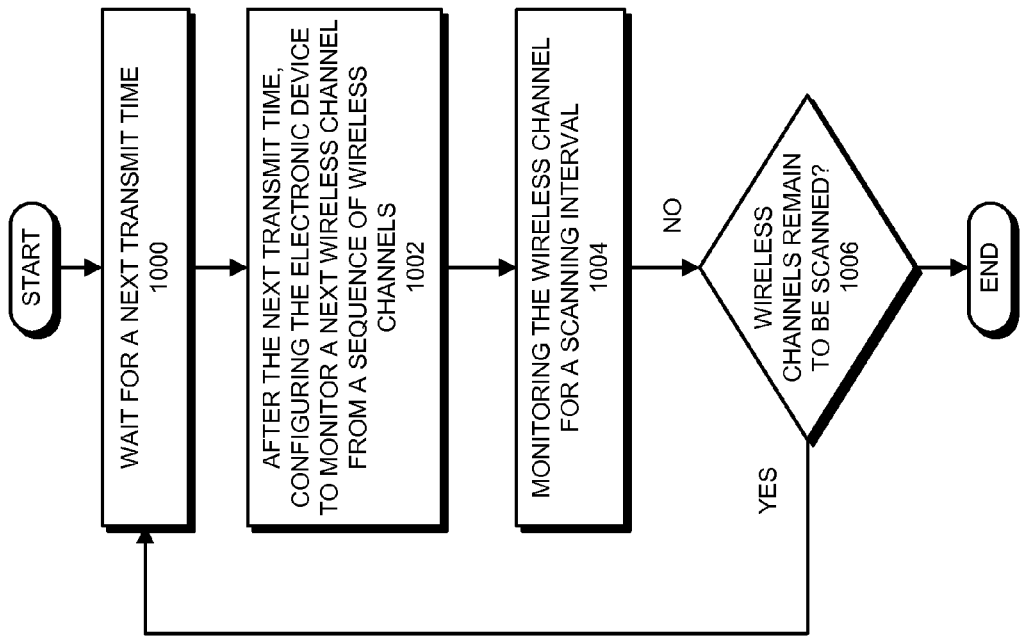
FIG. 10 presents a flowchart illustrating a process for scanning a set of wireless channels in accordance with the described embodiments.

FIG. 10 presents a flowchart illustrating a process the electronic device 200 uses to scan the set of wireless channels for advertising frames 500 transmitted by other electronic devices in accordance with the described embodiments. The process shown in FIG. 10 is an expanded view of step 902 in FIG. 9, showing a set of operations performed during step 902 in some embodiments.

The process in FIG. 10 starts when electronic device 200 waits for a next transmit time 104 (step 1000). As described above, transmit time 104 is a time at which the electronic device 200 can optionally transmit an advertising frame 500. However, transmit time 104 is also a time used to indicate when a next wireless channel from a sequence 600 of wireless channels should be scanned.

After the next transmit time 104, electronic device 200 configures itself to monitor a next wireless channel from the sequence 600 of wireless channels (step 1002). Configuring electronic device 200 to monitor the next wireless channel comprises performing operations to make it possible for electronic device 200 to receive wireless signals 414 from other electronic devices 200 and process the wireless signals 414 to determine if an advertising frame 500 has been received. This can mean configuring a radio 300 in networking subsystem 206 to receive wireless signals 414 at a corresponding frequency, configuring one or more circuits or processors within networking subsystem 206/electronic device 200 to extract frames from the received wireless signals 414, configuring one or more circuits and/or processors in networking subsystem 206/electronic device 200 to interpret the frames, etc.

Note that reconfiguring electronic device 200 to monitor for advertising frames 500 on a next wireless channel "after" the transmit time 104 means one of two things. In the first case, the electronic device 200 is transmitting advertising frames 500 at the transmit time 104, and hence the radio 300 needs to complete the transmission of the advertising frame 500 before the radio 300 can be reconfigured to monitor the next wireless channel. In the second case, electronic device 200 is not transmitting advertising frames 500 at the transmit time. In this case, the radio 300 can be reconfigured anytime after the transmit time, but before the scanning interval 102 is to begin. In some embodiments, the networking subsystem 206 can wait for a predetermined time after the transmit time 104 (e.g., 7 ms, 12 ms, etc.) before reconfiguring the radio 300.

Electronic device 200 then monitors the wireless channel for the advertising frames 500 for a scanning interval 102 (step 1004). When monitoring the wireless channel, electronic device 200 receives wireless signals 414 from other electronic devices 200 on the channel and processes the wireless signals 414 to determine if an advertising frame 500 has been received. When an advertising frame 500 is received, electronic device 200 can use information from the advertising frame 500 in making subsequent communications to the other electronic device from which the advertising frame 500 is received and/or for performing one or more configuration operations in electronic device 200 (e.g., reconfiguring the home channel, etc.).

After the scanning interval 102, electronic device 200 determines if any wireless channels remain to be scanned (step 1006). If so, electronic device 200 can return to step 1000 to wait for a next transmit time. Otherwise, if no channels remain to be scanned, the process ends.

Figure 11:
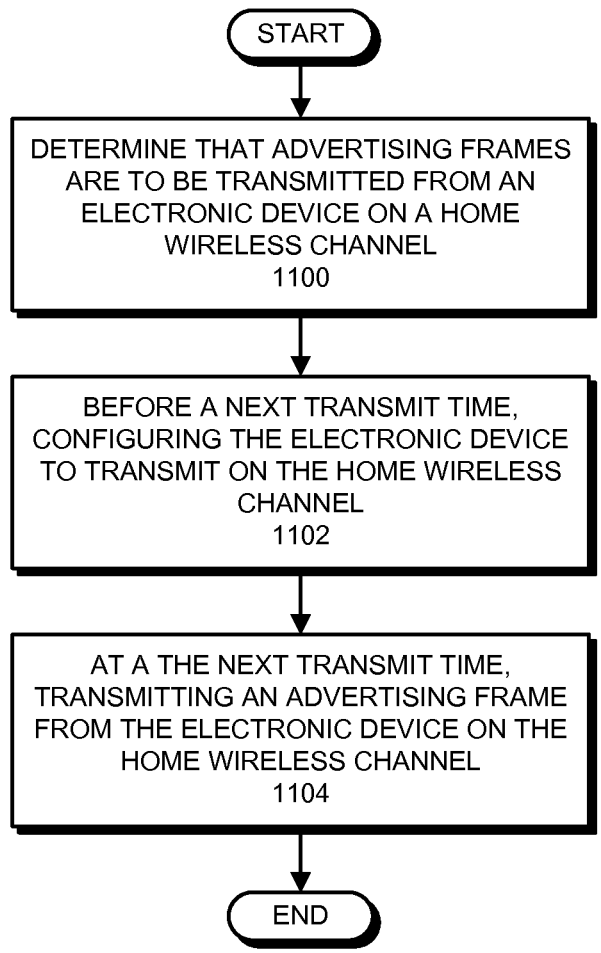
FIG. 11 presents a flowchart illustrating a process for transmitting advertising frames in accordance with the described embodiments.

FIG. 11 presents a flowchart illustrating a process for transmitting advertising frames 500 in accordance with the described embodiments. As described above, some embodiments may perform the scanning process without transmitting advertising frames 500 (e.g., to conserve power). Thus, the transmission of advertising frames is optional. In some embodiments, the electronic device 200 can be automatically and dynamically configured or reconfigured to perform (or not perform) the transmission of advertising frames 500. For example, the electronic device 200 can transmit advertising frames 500 at N consecutive transmit times, but can then stop transmitting advertising frames 500. For clarity, in this example it is assumed that the advertising frames are being transmitted at corresponding transmit time (and that electronic device 200 is not optionally not transmitting advertising frames 500).

The process shown in FIG. 11 starts when electronic device 200 determines that advertising frames 500 are to be transmitted from an electronic device 200 on a home wireless channel (step 1100). This can occur when networking subsystem 206 in electronic device 200 receives a signal (e.g., a transmit request, etc.) from an operating system on the device (which can come from an application on the device that is attempting to form connections with other devices) or otherwise determines that advertising frames 500 are to be transmitted.

In some embodiments, networking subsystem 206 can be configured to periodically and automatically transmit advertising frames 500. However, as described above, the power consumption targets for the electronic device 200 can be restrictive, so the automated transmission of advertising frames 500 can occur infrequently. For example, the device can transmit advertising frames 500 for N consecutive transmit times every 10 s (versus continuous transmissions of advertising frames 500). In these embodiments, determining that the advertising frames 500 are to be transmitted as in step 1100 can mean determining that an automatic scan is to be performed.

Before a next transmit time, electronic device 200 configures itself to transmit on the home wireless channel (step 1102). Configuring electronic device 200 to transmit on the home wireless channel comprises performing operations to make it possible for electronic device 200 to assemble advertising frames 500 and transmit the advertising frames 500 in wireless signals 414 that can be received by other electronic devices. This can mean configuring a radio 300 in networking subsystem 206 to transmit wireless signals 414 at a corresponding frequency and/or configuring one or more circuits or processors within networking subsystem 206/electronic device 200 to assemble an advertising frame 500 (e.g., collect data for the frame, compute error-correcting values, create the frame itself, etc.).

Then, at the corresponding transmit time, the electronic device 200 transmits an advertising frame 500 on the home wireless channel (step 1104). This comprises transmitting a wireless signal 414 into which the advertising frame 500 has been embedded/encoded so that other electronic devices can receive the wireless signals and extract from the wireless signals the advertising frame 500.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for wirelessly communicating between electronic devices, comprising:
configuring a first electronic device to transmit advertising frames on a home wireless channel, wherein the home wireless channel is one wireless channel in a sequence of wireless channels associated with a plurality of electronic devices;
identifying, with the first electronic device, the sequence of wireless channels;
scanning, with the first electronic device, the sequence of wireless channels by:
configuring, after a first transmit time, the first electronic device to monitor a first wireless channel in the sequence of wireless channels;
monitoring, during a first scanning time interval, the first wireless channel for an advertising frame sent from an electronic device associated with the first wireless channel; and
configuring, after the first scanning time interval, the first electronic device to transmit an advertising frame on the home wireless channel during a second transmit time following the first scanning time interval, wherein the duration of time between the first transmit time and the second transmit time is a transmit interval, and wherein each wireless channel in the sequence of wireless channels has a unique transmit interval duration.

2. The method of claim 1, wherein scanning with the first electronic device further comprises:

transmitting, on the first electronic device's home wireless channel, an advertising frame during the first transmit time.

3. The method of claim 2, wherein the sequence of wireless channels comprise wireless channels from a predetermined group of social wireless channels, and wherein the first electronic device's home wireless channel is a channel from the group of social wireless channels.

4. The method of claim 2, wherein configuring the first electronic device to monitor the first wireless channel in the sequence of wireless channels further comprises:
waiting a predetermined time after the first transmit time before configuring the electronic device to monitor the first wireless channel.

5. The method of claim 2, wherein the duration of the first scanning time interval is equal to the transmit interval minus an overhead value, wherein the overhead value comprises a sum of:
a time for configuring the first electronic device to transmit on the first electronic device's home wireless channel;
a time for transmitting an advertising frame on the first electronic device's home wireless channel; and
a time for configuring the first electronic device to monitor the first wireless channel in the sequence of wireless channels.

6. The method of claim 5, wherein the first scanning time interval is a predetermined multiple of the overhead value.

7. The method of claim 1, wherein the advertising frame sent by the electronic device associated with the first wireless channel comprises information for communicating with the electronic device associated with the first wireless channel.

8. The method of claim 1, wherein the method further comprises:
generating, by the first electronic device, the sequence of wireless channels, wherein the sequence of wireless channels comprises a plurality of subsequences, each subsequence comprising a group of social wireless channels arranged in a predetermined order.

9. An electronic device that wirelessly communicates with other electronic devices, comprising:
a first electronic device comprising a processing subsystem configured to:
configure a first electronic device to transmit advertising frames on a home wireless channel, wherein the home wireless channel is one wireless channel in a sequence of wireless channels associated with a plurality of electronic devices;
identify, with the first electronic device, the sequence of wireless channels;
scan, with the first electronic device, the sequence of wireless channels by:
configuring, after a first transmit time, the first electronic device to monitor a first wireless channel in the sequence of wireless channels;
monitoring, during a first scanning time interval, the first wireless channel for an advertising frame sent from an electronic device associated with the first wireless channel; and
configuring, after the first scanning time interval, the first electronic device to transmit an advertising frame on the home wireless channel during a second transmit time following the first scanning time interval, wherein the duration of time between the first transmit time and the second transmit time is a transmit interval, and wherein each wireless channel in the sequence of wireless channels has a unique transmit interval duration.

10. The electronic device of claim 9, wherein the processing subsystem is further configured to:
transmit, on the first electronic device's home wireless channel, an advertising frame during the first transmit time.

11. The electronic device of claim 10, wherein the sequence of wireless channels comprise wireless channels from a predetermined group of social wireless channels, and wherein the first electronic device's home wireless channel is a channel from the group of social wireless channels.

12. The electronic device of claim 10, wherein, when configuring the first electronic device to monitor the first wireless channel in the sequence of wireless channels, the processing subsystem is further configured to:
wait a predetermined time after the first transmit time before configuring the electronic device to monitor the first wireless channel.

13. The electronic device of claim 10, wherein the duration of the first scanning time interval is equal to the transmit interval minus an overhead value, wherein the overhead value comprises a sum of:
a time for configuring the first electronic device to transmit on the first electronic device's home wireless channel;
a time for transmitting an advertising frame on the first electronic device's home wireless channel; and
a time for configuring the first electronic device to monitor the first wireless channel in the sequence of wireless channels.

14. The electronic device of claim 13, wherein the first scanning time interval is a predetermined multiple of the overhead value.

15. The electronic device of claim 9, wherein the advertising frame sent by the electronic device associated with the first wireless channel comprises information for communicating with the electronic device associated with the first wireless channel.

16. The electronic device of claim 9, wherein the processing subsystem is further configured to generate, by the first electronic device, the sequence of wireless channels, wherein the sequence of wireless channels comprises a plurality of subsequences, each subsequence comprising a group of social wireless channels arranged in a predetermined order.

17. A networking subsystem in an electronic device, comprising:
a first radio; and
a configuration mechanism coupled to the first radio configured to:
cause, after a first transmit time, the first radio to monitor a first wireless channel in a sequence of wireless channels;
cause, during a first scanning time interval, the first radio to monitor the first wireless channel for an advertising frame sent from a second radio associated with the first wireless channel; and
cause, after the first scanning time interval, the first radio to transmit an advertising frame during a second transmit time on a home wireless channel following the first scanning time interval, wherein the home wireless channel is one wireless channel in the sequence of wireless channels, wherein the duration of time between the first transmit time and the second transmit time is a transmit interval, and wherein the each wireless channel in the sequence of wireless channels has a unique transmit interval duration.

18. The networking subsystem of claim 17, wherein the configuration mechanism is further configured to transmit, on the first radio's home wireless channel, an advertising frame during the first transmit time.

19. The networking subsystem of claim 18, wherein the sequence of wireless channels comprises wireless channels from a predetermined group of social wireless channels, and wherein the radio's home wireless channel is a channel from the group of social wireless channels.

20. The networking subsystem of claim 18, wherein the configuration mechanism is further configured to:
wait a predetermined time after the first transmit time before configuring the first radio to monitor the first wireless channel.

21. The networking subsystem of claim 18, wherein the duration of the first scanning time interval is equal to the transmit interval minus an overhead value, wherein the overhead value comprises a sum of:
a time for configuring the radio to transmit on the radio's home wireless channel;
a time for transmitting an advertising frame on the radio's home wireless channel; and
a time for configuring the radio to monitor the first wireless channel in the sequence of wireless channels.

22. The networking subsystem of claim 21, wherein the first scanning time interval is a predetermined multiple of the overhead value.

23. The networking subsystem of claim 17, wherein the advertising frame sent by the second radio comprises information for communicating with the first radio.

24. The networking subsystem of claim 17, wherein the sequence of wireless channels comprises a plurality of subsequences, each subsequence comprising a group of social wireless channels arranged in a predetermined order.

* * * * *